United States Patent [19]

Rawson et al.

[11] Patent Number: 4,531,238
[45] Date of Patent: Jul. 23, 1985

[54] STATISTICAL CONTENTION CONTROL FOR STAR CONFIGURED COMMUNICATION NETWORKS

[75] Inventors: Eric G. Rawson, Saratoga; Hallam G. Murray, Menlo Park; Ronald V. Schmidt, Portola Valley; Lawrence C. Stewart, Palo Alto, all of Calif.

[73] Assignee: Xerox Corporation, Stamford, Conn.

[21] Appl. No.: 326,869

[22] Filed: Dec. 3, 1981

[51] Int. Cl.³ .............................................. H04B 9/00
[52] U.S. Cl. ..................... 455/601; 455/607; 455/9; 340/825.5; 370/93; 375/3
[58] Field of Search ................ 455/601, 606, 607, 58, 455/9; 340/825.50, 825.51; 350/96.15, 96.16; 370/85, 93, 95; 375/3

[56] References Cited

U.S. PATENT DOCUMENTS

| | | | |
|---|---|---|---|
| 4,063,220 | 12/1977 | Metcalfe et al. | 340/825.5 |
| 4,099,024 | 7/1978 | Boggs et al. | 370/94 |
| 4,161,786 | 7/1979 | Hopkins et al. | 370/95 |
| 4,234,968 | 11/1980 | Singh | 455/607 |
| 4,271,523 | 6/1981 | Gable | 340/828.5 |
| 4,292,623 | 9/1981 | Eswaran et al. | 340/825.5 |
| 4,330,869 | 5/1982 | Robieux | 455/607 |

FOREIGN PATENT DOCUMENTS 0067431 12/1982 Fed. Rep. of Germany.

OTHER PUBLICATIONS

Laser Focus, vol. 18, No. 4, Apr. 1982, pp. 188-190, Newton, Mass. (USA) "Prototype Fibernet II Detects Data Collisions".

Compcon 80, Twenty-first IEEE Computer Society International Conference, Washington, S. A. Kahn et al., "Funtional & Logical Description of a New Fiber-Optic Contention Bus Network", pp. 268-272.

Primary Examiner—John C. Martin
Assistant Examiner—Edward L. Coles

[57] ABSTRACT

An active repeater for a star configured communications network includes a threshold detector for collision detection. Whenever two or more terminals simultaneously feed data into the repeater, a threshold sensitive collision detector is triggered to logically isolate the data from the output of the repeater and to logically substitute a predetermined collision signal therefor, thereby causing the competing terminals to reset to retry the transmissions at randomly selected later times.

10 Claims, 2 Drawing Figures

STATISTICAL CONTENTION CONTROL FOR STAR CONFIGURED COMMUNICATION NETWORKS

FIELD OF THE INVENTION

This invention relates to statistical contention control for communication networks and, more particularly, to collision detection for statistical contention control of star configured communication networks.

BACKGROUND OF THE INVENTION

Statistical contention is rapidly becoming a preferred technique for controlling local area communication networks and the like. The basic statistical contention network control process is described in a commonly assigned Metcalfe et al. U.S. Pat. No. 4,063,220, which issued Dec. 13, 1977 on a "Multipoint Data Communication System with Collision Detection". Moreover, that process is now in use, for example, in connection with the Xerox Ethernet local area network.

As is known, statistical contention control (1) gives each terminal on a communications network equal access to a shared communication medium on a contention basis and (2) resolves any "collisions" that occur when two or more terminals more or less simultaneously attempt to transmit over the communications medium by resetting those terminals to retry at randomly selected later times. In packet-type communication networks, such as the Ethernet local area network, collisions are relatively rare, and the delays that are encountered when collisions do occur are usually so brief that they are generally imperceptible to the ordinary user.

Reliable collision detection is, of course, essential for successful statistical contention network control. Heretofore, in keeping with the teachings of the aforementioned Metcalfe et al. patent, the collision detection function has been performed at the transceivers which interface the terminals to the comunications medium. That has proven to be a completely acceptable response to the collision detection requirement for networks employing coaxial cable as the communications medium, such as the Ethernet network. However, efforts to embody the collision detection function in the transceivers for the terminals of optical communications networks have led to the conclusion that such an embodiment requires that the transceivers either have DC coupled receiver sections or be equipped with relatively complex and expensive timing circuitry. As a result, designers of such transceivers have been faced with difficult cost/performance tradeoffs.

SUMMARY OF THE INVENTION

In accordance with the present invention, an active repeater for a star configured communications network includes a threshold detector for collision detection. Whenever two or more terminals simultaneously feed data into the repeater, the threshold detector is triggered to logically isolate the data from the output of the repeater and to logically substitute a predetermined collision signal therefor, thereby causing the competing terminals to reset to retry the transmissions at randomly selected later times. As will be appreciated, star networks are commonly used for optical communications to take advantage of the relatively low insertion loss characteristics of optical star couplers, but star network architectures are not necessarily limited to optical communications.

BRIEF DESCRIPTION OF THE DRAWINGS

Other features and advantages of the present invention will become apparent when the following detailed description is read in conjunction with the attached drawings, in which.

DETAILED DESCRIPTION OF THE ILLUSTRATED EMBODIMENT

While the invention is described in some detail hereinbelow with reference to a single illustrated embodiment, it is to be understood that there is no intent to limit it to that embodiment. On the contrary, the aim is to cover all modifications, alternatives and equivalents falling within the spirit and scope of the invention as defined by the appended claims.

Figure 1:
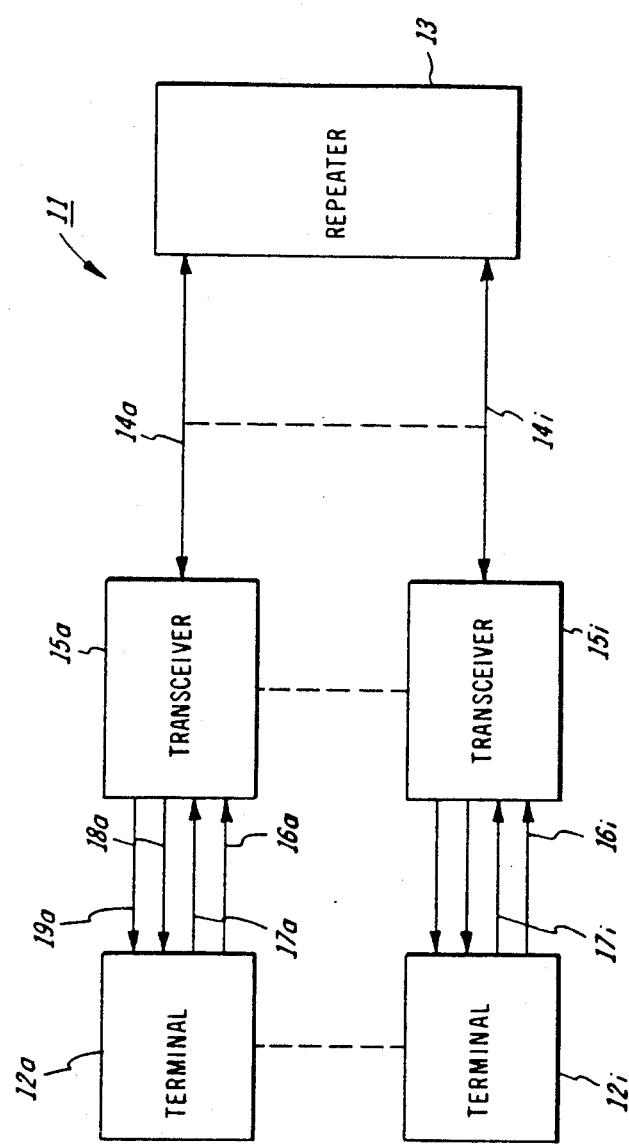
FIG. 1 is a simplified block diagram of a star configured optical communications network.

Turning now to the drawings, and at this point particularly to FIG. 1, there is a star configured communications network 11 comprising a plurality of terminals 12a–12i (e.g., workstations; shared resources, such as printers and file servers; and/or other types of processing stations) which are coupled to an active repeater station 13 by bidirectional data channels 14a–14i, respectively.

In keeping with accepted practices, there are transceivers 15a–15i for interfacing the terminals 12a–12i to the data channels 14a–14i, respectively. The terminals 12a–12i supply power for the transceivers 15a–15i via suitable power lines 16a–16i, and the transceivers 15a–15i, in turn, perform any transformations that are required for the terminals 12a–12i to transmit and receive data via the data channels 14a–14. For example, as shown, the data channels 14a–14i are optical links. Moreover, the terminals 12a–12i are configured to transmit and receive baseband electrical data on data lines 17a–17i and 18a–18i, respectively. Thus, the transceivers 15a–15i perform the necessary electrical/optical conversions, as well as any required passband/baseband transformations.

Data transmitted by any one of the terminals 12a–12i is repeatered by the repeater 13 and is then re-transmitted to all of the terminals 12a–12i. Address headers or the like may accompany the data so that it is received only by the terminal or terminals for which it is intended, but all of the transceivers 15a–15i detect the "busy" condition of the network 11, thereby preventing any of the other terminals 12a–12i from transmitting while the network 11 is busy. In other words, all of the terminals 12a–12i have equal access to the network 11 on a contention basis.

Should two or more of the terminals 12a–12i more or less simultaneously start to transmit data, the transceivers 15a–15i may not detect a network busy condition and, therefore, the competing terminals 12a–12i may simultaneously have access to the network 11. However, in accordance with the present invention as described in additional detail hereinbelow, the repeater 13 senses that there is competing data on the network 11 (i.e., a "collision") and sends a predetermined collision signal to the transceivers 15a–15i. The transceivers 15a–15i transform this signal as previously described, and apply the transformed collision signal to the terminals 12a–12i, respectively, via suitable control lines 19a–19i. Thus, the collision is resolved, as in other statistical contention networks, by causing the competing terminals 12a–12i to reset to retry the colliding transmissions at randomly selected later times.

As will be appreciated, the collision signal supplied by the repeater 13 may be an in-band or an out-of-band signal. If in-band signalling is used (i.e., if the collision signal lies within the bandwidth allotted to the data), the collision signal must have a characteristic which enables the transceivers 15a–15i to readily discriminate it from the data. For example, an in-band collision signal might violate the data encoding rules in a predetermined manner to allow for such discrimination.

Figure 2:
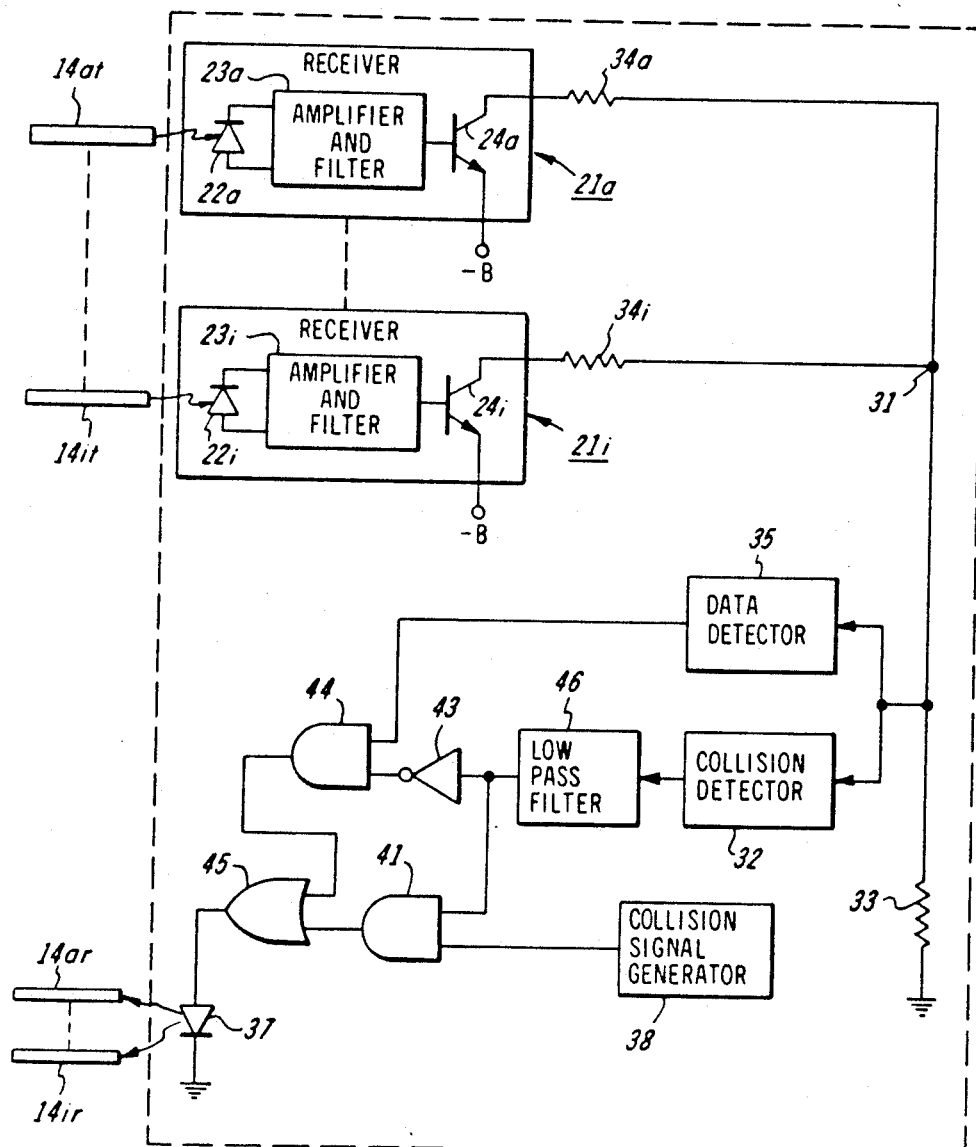
FIG. 2 is a simplified schematic diagram of the star repeater that is used in the network of FIG. 1 to carry out the present invention.

Referring to FIG. 2, the optical data links 14a–14i (FIG. 1) suitably comprise separate pairs of fiber optic waveguides 14at, 14ar–14it, 14ir for transmitting data from and to the transceivers 15a–15i, respectively. In keeping with standard practices, the repeater 13 has dedicated receivers 21a–21i for amplifying and filtering the incoming signals on the waveguides 14at–14it. To that end, the receivers 21a–21i include photodetectors 22a–22i for converting the optical signals on the waveguides 14at–14it into corresponding electrical signals, amplifier and filter stages 23a–23i for regenerating the incoming signals (i.e., for repeatering those signals), and output stages 24a–24i for supplying output currents representing the repeatered signals.

To carry out the present invention, the outputs of the receivers 21a–21i are brought together at a current summing node 31, so that a threshold responsive collision detector 32 can sense the presence of data on any two or more of the receivers 21a–21i. As shown, the output current sources 24a–24i for the receivers 21a–21i are common emitter NPN transistors. Thus, to allow for the use of a voltage threshold device as the collision detector 32, the summing node 31 is returned to ground through a resistor 33. Furthermore, the transistors 24a–24i have their emitters coupled to a suitable supply source B- and their collectors coupled to the node 31 by respective resistors 34a–34i, so that the magnitude of the voltage dropped across the resistor 33 increases (thereby causing the voltage between the node 31 and ground to become increasingly negative) as a function of the number of receivers 21a–21i that are receiving data at any given time. Preferably, the resistors 34a–34i have substantially equal values to establish the aforementioned functional relationship and have significantly greater resistance than the resistor 33 so that the voltage dropped across the resistor 33 (i.e., the voltage at the node 31) is relatively noise-free.

A threshold responsive data detector 35 is connected to the node 31 to isolate a repeater output light source 37, such as a light emitting diode (LED), from the receivers 21a–21i until data is applied to at least one of them. When data is applied to any one of the receivers 21a–21i, the voltage between the node 31 and ground drops to a sufficiently low level to satisfy the threshold of the data detector 35. If, however, data is applied to only one of the receivers 21a–21i, the voltage at the node 31 does not drop to a sufficiently low level to satisfy the threshold of the collision detector 32.

In keeping with the present invention, the light source 37 is driven by the data detector 35 or by a collision signal generator 38 whenever data is applied to any one of the receivers 21a–21i. As will be seen, there is logic which is controlled by a control signal from the collision detector 32 to selectively couple the light source 37 to the data detector 35 or to the collision signal generator 38 depending on whether only one or more than one of the receivers 21a–21i is receiving data.

More particularly, if data is applied to only one of the receivers 21a–21i, the collision detector 32 supplies a low logic level ("0") output signal which is applied to an AND gate 41 to isolate the collision signal generator 38 from the light source 37. An inverter 43 inverts the logic level of the output signal from the collision detector 32 and applies the inverted signal to another AND gates 44. Accordingly, when data is applied to only one of the receivers 21a–21i, the AND gate 44 is enabled such that the data detector 35 drives the light source 37 via an OR gate 45, whereby the repeatered data is injected into the waveguides 14ar–14ir for transmission to the transceivers 15a–15i, respectively.

On the other hand, if data is applied to two or more of the receivers 21a–21i, the collision detector 32 is triggered by the relatively low voltage level at the node 31. Under those circumstances, there is a relatively high logic level ("1") signal at the output of the collision detector 32 to enable the AND gate 41 and to cause the inverter 43 to disable the AND gate 44. As a result, the data detector 35 is isolated from the light source 37 by the AND gate 44. Now, however, the AND gates 41 and the OR gate 45 connect the collision signal generator 38 to the light source 37, whereby a predetermined collision signal is injected into the waveguides 14ar–14ir for transmission to the transceivers 15a–15i. As will be seen, the output of the collision detector 32 may be fed to the AND gate 41 and to the inverter 43 through a low pass filter 46 to suppress false collision signalling which might otherwise be caused, for example, by voltage transients at the node 31.

CONCLUSION

In view of the foregoing, it will now be understood that present invention provides an active repeater which is capable of performing the collision detection required for statistical contention control of star configured communication networks.

What is claimed is:

1. In a star configured communications network having a plurality of terminals, a common node, and a plurality of bidirectional communication channels coupled between said common node and respective ones of said terminals for transferring data to and from said terminals; the improvement comprising a data detector within said common node for detecting data received from said terminals, a collision signal generator for supplying a collision signal, a collision detector within said common node for supplying a control signal whenever data is being received from at least two of said terminals simultaneously, logic means within said common node; said logic means being coupled to said data detector, said collision signal generator, and said collision detector for selectively coupling said data detector and said collision signal generator to said communication channels in the absence and presence of said control signal, respectively, whereby data is transferred to said terminals whenever data is being received from only one of said terminals and said collision signal is transferred to said terminals in lieu of data whenever data is being received from at least two of said terminals simultaneously, and means coupled to said terminals for resetting said terminals in response to said collision signal, whereby said terminals contend for control of said network and are subject to being reset whenever they compete for control.

2. The improvement of claim 1 further including a plurality of transceivers for interfacing said terminals to respective ones of said communication channels, said transceivers including means for applying reset signals to said terminals in response to said collision signal;

an active repeater within said common node for amplifying and filtering said data.

3. The improvement of claim 2 wherein said communication channels are optical links, and said transceivers and said repeater include electrical/optical transformation means for interfacing said terminals and said repeater, respectively, to said optical links.

4. The improvement of claim 2 wherein said repeater includes a plurality of dedicated receivers for amplifying and filtering data received via respective ones of said channels, and output means for feeding signals back into said channels for retransmission to said transceivers, and said data detector has a predetermined threshold, whereby said output means is isolated from said receivers in the absence of data.

5. The improvement of claim 4 wherein said communication channels are optical links, said transceivers include electrical/optical transformation means for interfacing said terminals to said optical links, and said receivers and said output means include electrical/optical transformation means for interfacing said repeater to said optical links.

6. The improvement of claim 4 wherein said receivers have output stages which are interconnected at a summing node; and said data detector and said collision detector have inputs which are coupled to said summing node to determine when data is being applied to said receivers and to determine when data is being applied to more than one of said receivers, respectively.

7. The improvement of claim 6 wherein said communication channels are optical links, each of said optical links includes a pair of optical waveguides, said transceivers include electrical/optical transformation means for interfacing said terminals to the waveguides of respective ones of said optical links, said receivers include electrical/optical transformation means for interfacing said repeater to one of the waveguides of each of said optical links, and said output means include electrical/optical transformation means for interfacing said repeater to the other waveguide of each of said optical links.

8. The improvement of claim 6 wherein said data detector and said collision detector have predetermined voltage thresholds, and said data detector and said collision detector have inputs coupled to said summing node by means which develop a voltage that is a function of the number of said receivers that are receiving data at any given time.

9. The improvement of claim 8 further including a low pass filter coupled between said collision detector and said logic means for filtering said control signal, thereby suppressing false collision signalling.

10. The improvement of claim 9 wherein said communication channels are optical links, each of said optical links includes a pair of optical waveguides, said transceivers include electrical/optical transformation means for interfacing said terminals to the waveguides of respective ones of said optical links, said receivers include electrical/optical transformation means for interfacing said repeater to one of the waveguides of each of said optical links, and said output means include electrical/optical transformation means for interfacing said repeater to the other waveguide of each of said optical links.

* * * * *